United States Patent [19]

Singh et al.

[11] 4,389,467
[45] Jun. 21, 1983

[54] POROUS ELECTROLYTE RETAINER FOR MOLTEN CARBONATE FUEL CELL

[75] Inventors: Raj N. Singh; Joseph T. Dusek, both of Downers Grove, Ill.

[73] Assignee: The United States of America as represented by the United States Department of Energy, Washington, D.C.

[21] Appl. No.: 211,001

[22] Filed: Nov. 28, 1980

Related U.S. Application Data

[63] Continuation of Ser. No. 107,741, Dec. 27, 1979.

[51] Int. Cl.³ .............................................. H01M 8/14
[52] U.S. Cl. ...................................... 429/41; 429/193; 264/125
[58] Field of Search ....................... 429/16, 41, 38, 46, 429/12, 247, 193; 264/125, 86

[56] References Cited

U.S. PATENT DOCUMENTS

| | | | |
|---|---|---|---|
| 2,276,188 | 3/1942 | Greger | 429/46 |
| 2,980,749 | 4/1961 | Broers | 429/38 |
| 3,268,365 | 8/1966 | McQuade et al. | 429/16 |
| 3,845,185 | 10/1974 | Kamigaito et al. | 264/125 |
| 4,079,171 | 3/1978 | Marianowski et al. | 429/46 |
| 4,115,632 | 9/1978 | Kinoshita et al. | 429/46 |

FOREIGN PATENT DOCUMENTS 1189365  4/1970  United Kingdom ................. 429/41

OTHER PUBLICATIONS

Broers et al., Recent Developments in High-Temperature Fuel-Cell Research in the Netherlands, Young, Fuel Cells, vol. II, pp. 6-23, 1963.
Sim et al., Testing of Sintered $LiAlO_2$ Structures in Molten Carbonate Fuel Cells, J. Electrochem. Soc., Electrochemical Science, and Technology, pp. 1166-1168, 1980.

*Primary Examiner*—Donald L. Walton

[57] ABSTRACT

A porous tile for retaining molten electrolyte within a fuel cell is prepared by sintering particles of lithium aluminate into a stable structure. The tile is assembled between two porous metal plates which serve as electrodes with fuels gases such as $H_2$ and CO opposite to oxidant gases such as $O_2$ and $CO_2$. The tile is prepared with a porosity of 55-65% and a pore size distribution selected to permit release of sufficient molten electrolyte to wet but not to flood the adjacent electrodes.

11 Claims, 4 Drawing Figures

POROUS ELECTROLYTE RETAINER FOR MOLTEN CARBONATE FUEL CELL

CONTRACTUAL ORIGIN OF THE INVENTION

The invention described herein was made in the course of, or under, a contract with the UNITED STATES DEPARTMENT OF ENERGY.

This is a continuation, of application Ser. No. 107,741, filed Dec. 27, 1979.

BACKGROUND OF THE INVENTION

The present invention relates to porous structures or tiles and methods of their preparation for use containing molten electrolyte in electrochemical cells. It is particularly adapted for use in fuel cells but may also have application within molten-salt secondary electrochemical cells. The tiles are of electrically insulating ceramics in the form of flat porous plates of sufficient porosity and pore size to retain molten electrolyte between the cell electrodes.

A fuel cell of the type contemplated can include a porous metal structure of such as a nickel alloy as the anode and a similar structure as the cathode in which a metal oxide such as NiO is formed during cell operation. Suitable metallic current collectors are included for support and electrical transmission from the electrodes. Bipolar cells can be stacked together with electrically conductive separators shaped to form gas manifolds for the fuel and oxidant gases. In these bipolar cells, the metal separators can form a wet seal with the electrically insulative electrolyte tile at the outer marginal portions of the tile.

A fuel cell employing molten alkali metal carbonate as electrolyte will typically operate at high temperatures of about 900–1000 K. to convert chemical energy to d.c. electricity. Fuels such as $H_2$ and CO and oxidant gases such as $O_2$ and $CO_2$ react together during this conversion.

In cells of this type, the electrolyte tile is an important component in determining the cell life. A suitable tile must have good strength to withstand thermal cycles and pressure differences between anode and cathode compartments. The tile also must be dimensionally, structurally and chemically stable with the temperature changes which occur between operating and nonoperating intervals. It is important that the tile provide a good wet seal at the tile separator interfaces and that it should be crack-free to minimize cross leakage of fuel and oxidant gases between the electrode compartments. Furthermore, the electrolyte-filled pores within the tile should match the pore distribution of the electrodes in such a manner as to enhance wicking but without flooding of electrolyte into each electrode to maintain a large surface area for reaction.

Present molten carbonate fuel cells employ hot-pressed electrolyte tiles with little or no fixed bonding between adjacent ceramic particles within the tile structure. The liquid electrolyte is held by capillary forces within the compact of discrete particles.

Lithium aluminate is well suited from a chemical compatibility standpoint for use in molten carbonate fuel cells. However, porous tiles of lithium aluminate material previously have not been prepared with good structural, dimensional and chemical properties for use as electrically insulative electrolyte retainers. The hot-pressed electrolyte tiles are typically formed by blending particulate lithium aluminate and the cell electrolyte in the desired proportions and compacting the solid mixture at a temperature slightly below the electrolyte melting point. This procedure forms a compact with the electrolyte thoroughly dispersed among and around the ceramic particles. The particles are not fused or otherwise bonded together but merely are held by mechanical compaction. Electrolyte tiles of this type have incurred particle growth, precipitation, reaction with electrolyte and other structural changes due to cracking and plastic deformations to shorten cell life.

The completed tile structure formed by hot-pressing the inert support in mixture with the electrolyte is a solid, generally nonporous member that cannot be conveniently characterized by microstructural techniques such as metallography, mercury porosimetry and internal surface area measurements. Measurements of this type are of considerable assistance in selecting and matching electrolyte tiles to be used with the desired electrodes. In addition, these compacted tiles do not exhibit the desired strength for providing adequate long-life wet seals between the cell separators and for preventing cross leaking of gases between the electrode compartments.

PRIOR ART STATEMENT

The following publications are related to but do not disclose applicants' invention as presently claimed.

U.S. Pat. No. 4,079,171 to Marianowski et al., "Molten Carbonate Fuel Cell Electrolyte", Mar. 14, 1978, discloses a fuel cell with a paste electrolyte of molten alkali metal carbonate and solid lithium aluminate. The electrolyte paste is preferably reinforced with refractory metal alloys of such as iron and chromium as screens, mesh, expanded sheets, fibers or particles.

U.S. Pat. No. 4,115,632 to Kinoshita et al., "Method of Preparing Electrolyte for Use in Fuel Cells". This patent discloses a method of preparing lithium aluminate particles of a preferred shape for use as ceramic support materal within a fuel cell electrolyte paste. This reference at column 5, lines 5–38, suggests a mixture of alkali metal compounds that may include lithium aluminate. It further suggests that the electrolyte material can be processed in a number of different fabrication methods to enhance its structural integrity. Sintering is mentioned along with other methods, but this reference in no manner teaches or puts the artisan in possession of the method of preparing or the structurally stable electrolyte tile of the present invention.

U.S. Pat. No. 2,980,749 to Broers teaches the use of a sintered magnesium oxide layer as a porous carrier of electrolyte in a fuel cell.

SUMMARY OF THE INVENTION

In view of the above, it is an object of the present invention to provide a porous and structurally stable tile of lithium aluminate for retaining a molten salt electrolyte.

It is a further object to provide a porous tile of lithium aluminate that exhibits good structural, dimensional and chemical stability when used for retaining molten carbonate electrolyte between electrodes of a fuel cell.

It is a further object to provide an improved fuel cell including a structurally stable tile for molten electrolyte with sufficient porosity and pore size to permit wicking but without flooding of electrolyte into the adjacent electrodes.

It is also an object to provide a method of preparing a thermally stable porous tile that exhibits good dimensional, structural and chemical stability within a fuel cell.

In accordance with the present invention, a porous flat tile for retaining molten salt electrolyte intermediate an anode and a cathode comprises a porous flat structure of $LiAlO_2$ particles bonded together by mutual diffusion at sintering conditions at points of contact over a portion of their surface area to form an integral, structurally stable mass.

In more specific aspects the tile is in excess of 50% porosity and preferably of about 55-65% porosity, with a surface area in excess of 7 $m^2/g$ and with a pore size distribution having a mean pore size of less than 1 $\mu m$ but having about 1-5% of the porosity, at more than 5 $\mu m$ size. The bonded lithium aluminate particles consist essentially of gamma lithium aluminate after sintering.

The invention also comprehends a fuel cell with porous plates serving as anode and cathode on opposite sides of a porous, structurally stable electrolyte tile of sintered lithium aluminate. One specific cell includes a sintered, porous metal plate containing nickel as the anode and a sintered, porous metal plate containing nickel oxide as the cathode structure. The porosity of the electrolyte tile is preferably at levels corresponding to but slightly less than the porosity of the electrode plates. However, the pore size distribution in the electrolyte tile is characterized by a mean pore size substantially less than that of the electrodes but with a small percentage of porosity as large as the mean pore size of the electrodes.

In one other aspect of the invention, a method is provided for preparing a porous and structurally stable electrolyte tile. The method comprises providing particulate lithium aluminate and compacting it to form a porous green tile of the desired shape. The green tile is sintered at a temperature above 1200 K. but below the melting point of lithium aluminate to form a porous and integral electrolyte tile with adjacent particles of lithium aluminate mutually diffused at the point of contact over a portion of their surface area. The void volume of the porous electrolyte tile is then filled with molten electrolyte for between the cathode and anode of a cell.

In more specific aspects of the invention, alumina is reacted with molten lithium carbonate in about stoiciometric amounts to form alpha lithium aluminate. In one procedure, the alpha lithium aluminate is heat treated at about 1000-1200 K. to form gamma lithium aluminate powder which is cold pressed at about 3-10 MPa into a compact of the desired shape. Alternatively, the compact can be formed of the high-surface area alpha material. A volatile binder material can be blended with either the alpha or the gamma material prior to forming the compact to impart good strength in the green compact and to enhance the porosity of the sintered structure. Sintering is preferably performed at about 1200-1400 K.

DESCRIPTION OF THE FIGURES

The present invention is described in the accompanying drawings wherein.

DETAILED DESCRIPTION OF THE PREFERRED EMBODIMENT

Figure 1:
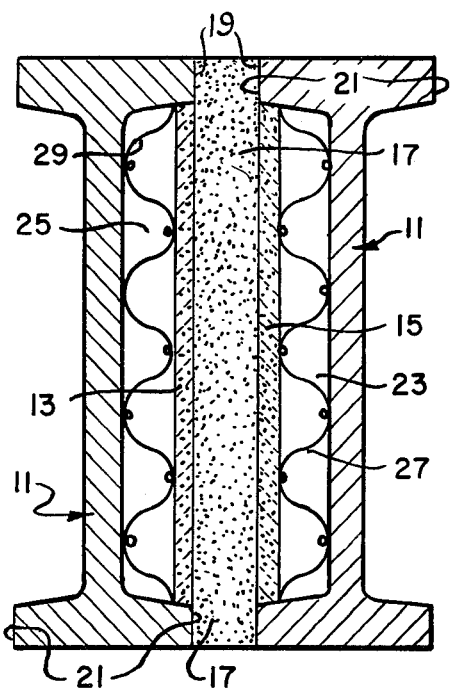
FIG. 1 is a schematic view in cross section of a bipolar fuel cell including a porous tile for retaining electrolyte.

FIG. 1 illustrates a bipolar fuel cell formed between two I-shaped cell separators 11. The cell includes a porous cathode plate 13, a porous anode plate 15 and a electrolyte tile 17 disposed between the two electrodes. The I-shaped cell separators contact the electrically insulative electrolyte tile at its outer marginal portions 19 to form a wet seal for molten electrolyte at the cell operating temperatures.

The cell separators are of a metal such as stainless steel or other high-temperature, corrosion-resistant alloys that are electrically conductive to permit electrical series stacking of a number of bipolar cells. Where necessary coatings containing aluminum can be used to protect against corrosion by high temperature molten carbonates. Additional electrolyte tiles can be positioned in sealing contact with flat outer surfaces 21 of the cell separator. Channels 23 and 25 for containing and passing the fuel gas and oxidant gas, respectively, are defined between the electrodes and the central portions of the I-shaped cell separators. Current collectors 27 and 29 are illustrated as corrugated metal sheets or mesh within channels 23 and 25 to electrically contact and support the respective electrodes. The current collectors 27 and 29 are of a suitable high-temperature, electrically conductive material such as a stainless steel.

The electrodes are provided as porous sintered metal plates of such as nickel with suitable alloys to impart added strength and dimensional stability. Chromium and/or cobalt are often alloyed with nickel for this purpose. The cathode may also be prepared as a porous plate of such as nickel that will react with the oxidant gases to form NiO within the cathode plates.

Electrolyte tile 17 is a structurally stable flat plate of porous lithium aluminate. The tile includes porosity and pore sizes selected to match that of the adjacent electrodes to enhance wetting of the porous electrodes with the molten electrolyte but without flooding the electrode. This increases the electrode surface area available to both the molten electrolyte and to the fuel and oxidant gases on which the electrochemical reaction can occur.

A porosity just slightly less than that of the electrodes is desired for the electrolyte tile. The tile should include a porosity in exess of 50% by volume, preferably about 55-65%, for use with electrodes of about 65-75% porosity.

Mean pore sizes in the tile should be substantially less than that of the adjacent electrodes but the tile should include a small percentage of its porosity with pores as large as the mean pore size of the electrodes. For example, mean pore sizes in the tile of about 0.1 to 1 $\mu m$, with about 1-5% porosity in excess of 5 $\mu m$ are suitable for use with electrodes of 5 to 10 $\mu m$ mean pore size. With this pore distribution only a portion of the contained electrolyte is released to wet but not flood the adjacent electrodes.

Tiles of sufficient area, thickness and porosity to contain enough electrolyte for wicking onto the surfaces of the two electrodes while retaining a sufficient electrolyte volume in the tile porosity for ionic conduction are needed. As an example, a typical tile of the above porosity can be about 0.1 m² and about 1 to 3 mm thick when disposed adjacent to an anode of 0.5 mm thickness and a cathode of about 0.3 mm thickness.

The tile structure is that of sintered lithium aluminate particles that are diffused together at contacting adjacent surfaces over only a portion of their surface areas. This provides a structurally stable plate that has good strength to take the thermal cycles and pressure differences between the anode and cathode compartments. In addition the tiles produced by the present method have good dimensional and chemical stability with temperature changes. The tile includes smooth flat surfaces at least at its outer marginal portions 19 for closely contacting the end side surfaces 21 of I-shaped cell separators 11 for making a good wet seal. However, the tile is preferably at least somewhat plastic at these end marginal portions to permit a slight amount of creep to fill irregularities in the sealing surfaces.

The electrolyte material retained within the porous electrolyte tile 17 is a mixture of molten alkali metal carbonates at the cell operating temperature. Typically electrolytes of about 50–62 mole percent $Li_2CO_3$ and the balance $K_2CO_3$ are employed. One suitable eutectic mixture of carbonates is 62 mole percent $LiCO_3$ and 38 mole percent $K_2CO_3$ which has a melting point of about 740 K. Various other suitable electrolyte mixtures including other combinations of these materials and with $Na_2CO_3$ are suggested in U.S. Pat. No. 4,115,632, cited above. This patent is expressly incorporated by reference for this purpose and for the typical construction and operation of such fuel cells.

Fuel cells of this type can employ various carbonaceous or hydrogen gases as fuels. For example, methanol, carbon monoxide and/or hydrogen have been proposed for use. One source of the fuel gas is that produced in the gasification of coal. This product gas includes both carbon monoxide and hydrogen. In such a cell the following reactions can occur at the anode:

$$H_2 + CO_3^{2-} \rightarrow CO_2 + H_2O + 2e$$

$$CO + CO_3^{2-} \rightarrow 2CO_2 + 2e$$

At the cathode, oxygen and carbon dioxide gas are used.

$$2e + CO_2 + \tfrac{1}{2}O_2 \rightarrow CO_3^{2-}$$

The carbon dioxide gas required at the cathode can be provided from that produced at or delivered to the anode.

In one manner of preparing the structurally stable porous tile 17, particulate gamma alumina is reacted with lithium carbonate, $Li_2CO_3$, at a temperature below the carbonate melting point to form alpha $LiAlO_2$. The gamma alumina used is preferably a dehydrated high surface area material of small particle size, e.g. about 100 m²/g area, and about 0.02 μm mean size.

The resulting alpha $LiAlO_2$ can be heat-treated at an elevated temperature of 1000–1200 K. to convert it to gamma $LiAlO_2$ which can be cold-pressed to form a green ceramic compact or tile. As an alternative, the alpha $LiAlO_2$ can be cold-pressed to form the green compact and subsequently converted to the gamma form during the sintering step. If necessary, a binder of such as corn starch, or a commercial binder such as Mobilcer C, a product of Socony Vacuum Company containing paraffin wax is added which also assists in forming pores during the subsequent sintering operation.

Alpha lithium aluminate offers the advantage of high surface area in the green particulate material and compact, e.g. about 55–70 m²/g compared to about 0.4–10 m²/g for gamma material. However, in compacting the alpha particles, a die lubricant should be used and care given to exclude unreacted lithium carbonate from the green compact to avoid deformation of the sintered tile.

The lithium aluminate can be comminuted by well-known techniques such as by ball-milling in ethanol to obtain the desired particle size. Alpha or Gamma lithium aluminate particle sizes of about 0.5 to 5 μm are preferred. Die pressures of about 3–10 MPa can be used to provide good strength in green tiles prepared from powders of the preferred particle sizes. Materials of much larger particle size require substantially higher pressures to provide an integral compact. However, substantial fractions of the powder with particle sizes much below 0.5 μm can result in tiles of too low a porosity and pore size to match the electrodes within the fuel cell.

A corrosion resistant wire mesh or screen reinforcement of an corrosion-resistent alloy can be cold-pressed into the green tiles to enhance mechanical strength in the finished sintered structure. Materials suitable for use at the high temperatures and conditions of the sintering operation and the fuel cell environment, for instance the Kanthal alloys of Fe, Cr, Al, Co and C, can be selected for use. The reinforcement can be included by filling half of the lithium aluminate into the die, adding the metal reinforcement followed by the remainder of the lithium aluminate powder.

The green tile compacts are sintered at an elevated temperature above the typical cell operating temperature of 900–1000 K. but below the melting temperature of lithium aluminate, about 2170–2270 K. For example a range of about 1200–1500 K. sintering temperatures are contemplated. Preferably temperatures in the range of 1200–1400 K. held for 0.5 to 12 hours are used to permit sufficient bonding of particles within the sinter without too much loss of porosity or of $Li_2O$.

Table I gives a summary of both powder and sintered structure characteristics for a number of tile preparations. Ball-milling was provided for size reduction of some of the gamma lithium aluminate preparations. The green tiles prior to sintering were formed by pressing in a die at a pressure of about 7–10 MPa (1000–1500 Psi).

TABLE I

| No. | $LiAlO_2$ Powder Form | Surface Area Powder (m²/g) | Sintering Conditions Temp. (K) | Time (h) | Porosity (%) | Sintered Tile Surface Area (m²/g) | Mean Pore Size (μm) |
|---|---|---|---|---|---|---|---|
| 17 | Gamma | 10 | 1373 | 0.5 | 63 | | |
| 27 | Alpha | 69 | 1373 | 0.5 | 60 | | |
| 58 | Alpha | 69 | 1473 | 2 | 37 | | |
| 2-P | Gamma | 7.5 | 1373 | 0.5 | 60 | | |

TABLE I-continued

| No. | LiAlO$_2$ Powder Form | Surface Area Powder (m$^2$/g) | Sintering Conditions Temp. (K) | Time (h) | Porosity (%) | Sintered Tile Surface Area (m$^2$/g) | Mean Pore Size (μm) |
|---|---|---|---|---|---|---|---|
| 40 | Gamma | 6 | 1373 | 0.5 | 53 | | |
| 63 | Gamma | 6 | 1373 | 4 | 53 | | |
| 65 | Gamma | 7.6 | 1373 | 4 | 44 | | |
| 67 | Gamma | 2.5 | 1373 | 4 | 45 | | |
| 69 | Gamma | 0.35 | 1373 | 4 | 45 | | |
| 71 | Gamma | 0.44 | 1373 | 4 | 46 | | |
| 78 | Gamma | 2.5 | 1373 | 3.5 | 56 | | |
| 4-P | Gamma | 7.5 | 1373 | 4 | 57 | 7 | ND |
| 16 | Gamma | 10 | 1373 | 0.5 | 64 | 11 | ND |
| 55 | Gamma | 6.4 | 1273 | 2 | 56 | 8 | 0.22 |
| 39 | Gamma | 6.4 | 1373 | 0.5 | 54 | 7 | 0.3 |
| 47 | Gamma | 6.4 | 1373 | 4 | 51 | 5 | 0.3 |
| 53 | Alpha | 69 | 1273 | 2 | 61 | 28 | 0.11 |
| 41 | Alpha | 69 | 1373 | 2 | 59 | 15 | 0.12 |
| 57 | Alpha | 69 | 1473 | 2 | 24 | 4 | 0.12 |

ND—not determined.

Figure 2:
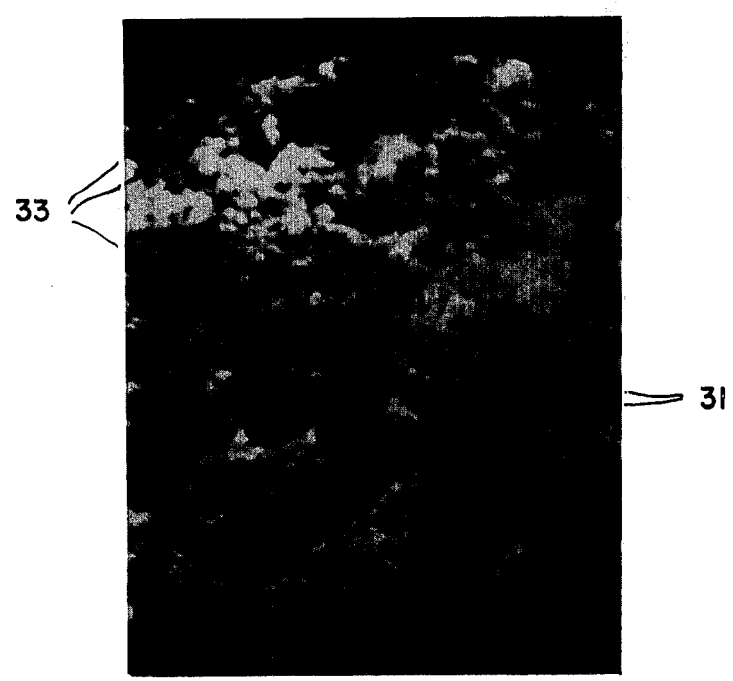
FIG. 2 is a photomicrograph of a porous sintered lithium aluminate structure.

FIG. 2 is a photomicrograph of a tile portion having about 60% porosity which was sintered at about 1370 K. for 0.5 hours from a green compact of gamma lithium aluminate powder having about 7.5 m$^2$/g surface area. The powder was cold pressed at about 7 MPa prior to sintering. Necking or diffusion bonding of adjacent particles over only part of their external surfaces are indicated by reference numbers 31 and 33. Other diffusion bonds are evident throughout the sintered material forming the porous but structurally stable tile suitable for retaining electrolyte between the electrodes of a cell.

After forming the porous tile, it is impregnated with the molten electrolyte prior to assembly within a fuel cell. This can be accomplished by preheating the sintered tile to above the melting temperature of the electrolyte and immersing it into molten electrolyte. By evacuating the internal volume of the tile prior to immersing and subsequently pressurizing the system, eg about 10-20 Kpa positive pressure with the tile submerged, nearly 100% of the porous volume can be filled.

Figure 3:
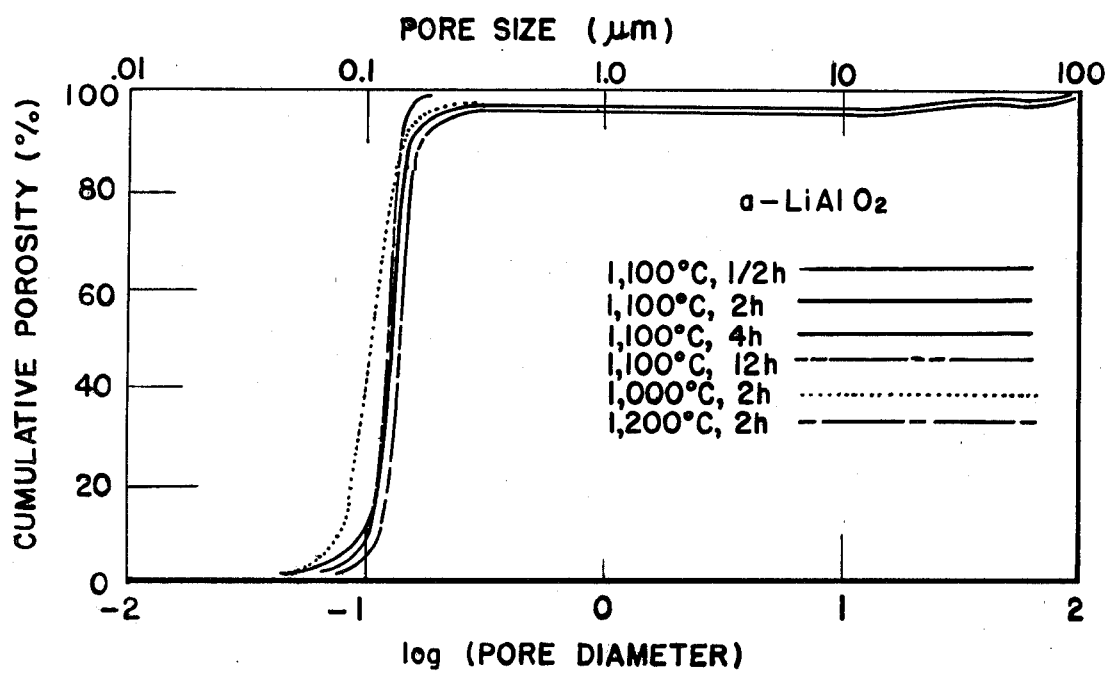
FIG. 3 is a graph of % cumulative porosity v log of pore diameter for sintered alpha lithium aluminate.
Figure 4:
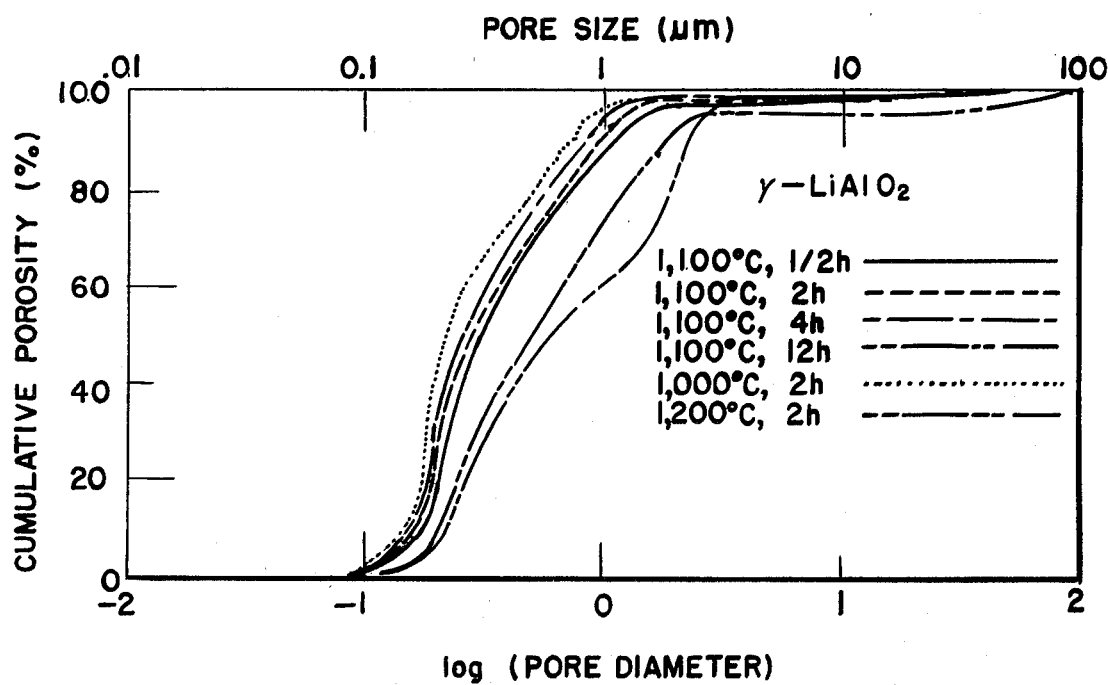
FIG. 4 is a graph of % cumulative porosity v log of pore diameter for sintered gamma lithium aluminate.

The pore size distribution of the sintered tiles formed from alpha lithium aluminate is very narrow as compared to that of tiles obtained from gamma lithium aluminate. In addition, the effects of sintering conditions on pore size are much greater for gamma than alpha lithium aluminate. These effects are clearly illustrated in FIGS. 3 and 4 which show pore size vs cumulative porosity for alpha and gamma particles, respectively. Therefore it is seen that the use of gamma lithium aluminate provides a greater ability to control pore size and porosity through sintering conditions than the use of alpha material. More importantly, the wider distribution of pore sizes in tiles prepared from gamma lithium aluminate aids in the selection of sintering conditions to give a desired distribution. However, it is clear from FIGS. 3 and 4 that both alpha and gamma lithium aluminate can be used to form a sintered tile with a mean pore size of about 0.1 to 1 μm and a pore size distribution substantially between about 0.1 to 1 μm with only about 1-5% of porosity in excess of 5 μm. Tiles of these characteristics can be employed with electrodes of 65-75% porosity and mean pore sizes of 5-10 μm to permit electrolyte in the tile to wick into and wet internal electrode surfaces but yet prevent release of large amounts of the electrolyte to flood and exclude reactant gases from the electrodes.

The following examples are presented merely to illustrate operation of a fuel cell using the electrolyte tiles as described herein.

EXAMPLE I

A tile prepared with gamma lithium aluminate pressed at about 7 MPa and sintered at about 1400 K. to form about 57-60% porosity and a surface area of about 7 m$^2$/g was assembled into a fuel cell of about 7 cm diameter. The cell included a porous nickel alloy anode and a porous nickel cathode that was oxidized to NiO during operation. The cell was operated at about 1000 K. using 80% H$_2$, 20% CO$_2$ fuel and 14.5% O$_2$, 28% CO$_2$, balance N$_2$ oxidant gas. After 453 hours operation and two thermal cycles to room temperature, the cell failed due to cracks in the electrolyte tile. However, during the operation fuel and oxidant flows of about 0.475 and 1.3 cm$^3$/s at about 1.5 KPa generally showed less than 5% cross leakage which gradually decreased as the cell operated. The wet seals at the tile-separator interface supported about 5 KPa pressure with about 99-100% retention. The cell was capable of a continuous electrical output of 0.7 V at 60 mA/cm$^2$.

EXAMPLE II

A tile was prepared in a similar manner to that of Example I except that a wire screen of Kanthal A-1 reinforcement was compacted into the green tile aligned parallel to major surfaces at about the middle of the tile thickness for reinforcement prior to sintering. The tile was assembled into a cell similar to that of Example I and operated in the same manner for 839 hours and five thermal cycles when it was voluntarily terminated. Except for immediately after the first thermal cycle the cell showed no cross leakage at pressures up to 7.5 KPa. The wet seal provided about 98-100% retention of electrolyte. The cell was capable of a continuous electrical output of 0.75 V at 60 mA/cm$^2$.

It will be clear from the above that tiles for retaining electrolyte in fuel cells may be prepared by compacting and sintering alpha lithium aluminate to form a stable integral structure of porous gamma lithium aluminate.

One other manner of providing a porous tile is described in the assignee's U.S. Pat. No. 4,251,600, Feb. 17, 1981, entitled "Method of Preparing a Sintered Lithium Aluminate Structure for Containing Electrolyte" by Sim and Kinoshita. In this method lithium hydroxide in aqueous solution is reacted with slurried particles of alumina and the product dehydrated at 700-900 K. to form beta lithium aluminate. The beta lithium aluminate is then pressed into a green compact and sintered to simultaneously convert the beta to gamma form while binding adjacent particles together by diffusion to form an integral porous structure at the sintering conditions.

Although the present invention is described in terms of separators for electrochemical cells designed and operated as fuel cells, it will be clear that with appropriate modifications such separators may also be employed within other electrochemical cells such as high-temperature, secondary electrochemical cells. Cells such as those suggested in the assignee's U.S. Pat. No. 4,244,898; Jan. 13, 1981 by Bandyopadhyay and Dusek entitled "Method of Preparing Porous Rigid Ceramic Separators for an Electrochemical Cell" could be provided with separators of the type described herein.

It is therefore seen from the above that the present invention provides an improved porous tile for retaining molten electrolyte within a cell. The tile structure can be provided with sufficient porosity and a pore size distribution to effectively retain electrolyte while permitting sufficient electrolyte release to wet electrode surfaces and permit the fuel cell reaction to occur. This tile can be sufficiently stable in respect to structure, dimensions and chemical reaction with electrolyte to allow operation over extended periods. By fabricating the cell from lithium aluminate at preferred sintering temperatures, a tile of controlled porosity and pore size can be obtained to closely match that required in the adjacent porous electrodes.

It will also be clear that, although the present invention is described in terms of specific materials and process conditions, various modifications can be made by one skilled in the art within the scope of the following claims.

The embodiments of the invention in which an exclusive property or privilege is claimed are defined as follows:

1. In a fuel cell including a porous metal plate for use as an anode electrode, a porous plate containing a metal oxide for use as a cathode electrode, the electrode plates having porosities of about 65-75%, first and second channel means for providing a fuel gas to the anode and an oxidant gas to the cathode respectively and a porous $LiAlO_2$ tile intermediate said cathode and anode plates, the improvement wherein said $LiAlO_2$ tile is a structurally stable plate of more than 50% porosity but of a porosity near to but below that of the electrode plates, said porous $LiAlO_2$ tile having particles consisting essentially of gamma $LiAlO_2$ bonded together at points of contact by mutual diffusion at sintering conditions.

2. The fuel cell of claim 7 wherein said sintering conditions comprise heating to a temperature above 1200 K. but below the melting point of $LiAlO_2$ with said particles in compacted contact with adjacent particles.

3. The fuel cell of claim 7 wherein said anode comprises a porous metal plate including nickel in elemental form in contact with a mixture of $H_2$ and CO gases, said cathode comprises a porous plate including an oxide of nickel in contact with a mixture of $CO_2$ and $O_2$ gases and said porous $LiAlO_2$ tile is impregnated with a mixture of alkali metal carbonates.

4. The fuel cell of claim 1 wherein said porous electrode plates have a mean pore size of 5-10 $\mu$m and wherein said $LiAlO_2$ tile is of about 55-65% porosity with a mean pore size of about 0.1 to 1 $\mu$m.

5. The fuel cell of claim 4 wherein said $LiAlO_2$ tile has a surface area of more than 7 $m^2/g$.

6. The fuel cell of claim 4 wherein said porous $LiAlO_2$ tile comprises gamma $LiAlO_2$ particles of about 0.5 to 5 $\mu$m diffusion bonded together over only a portion of their surface areas.

7. The fuel cell of claim 4 wherein said porous $LiAlO_2$ tile has a pore size distribution that is substantially between 0.1 and 1 $\mu$m with only about 1-5% porosity in excess of 5 $\mu$m.

8. A method of preparing an electrolyte tile for a fuel cell comprising reacting $Al_2O_3$ with $Li_2CO_3$ in about stoichiometric amounts to form alpha $LiAlO_2$;

pressing said alpha $LiAlO_2$ in particulate form at about 3-10 MPa to from a green compact of about 55-70 $m^2g$;

and sintering said green compact of alpha $LiAlO_2$ substantially free of unreacted $Li_2CO_3$ at about 1200-1400 K. for 0.5 to 12 hours to form a porous integral tile of more than 50% porosity with adjacent particles consisting essentially of gamma $LiAlO_2$ mutually diffused at points of contact over a portion of the particle surface area.

9. The method of claim 8 wherein the void volume of said porous integral tile is filled with molten electrolyte by heating said tile to a temperature above the melting point of said electrolyte, evacuating gases from said tile, immersing said evacuated tile into the molten electrolyte and pressurizing said electrolyte to a positve presure with the tile immersed in molten electrolyte.

10. The method of claim 8 wherein said $LiAlO_2$ in particulate form is with a volatile binder material selected from the group consisting of corn starch and paraffin.

11. A method of preparing an electrolyte tile for a fuel cell comprising reacting $Al_2O_3$ with $Li_2CO_3$ in about stoichiometric amounts, at about 800-900 K. to form alpha $LiAlO_2$, heating said alpha $LiAlO_2$ to 1000-1200 K. to form gamma $LiAlO_2$, pressing said gamma $LiAlO_2$ in particulate form at about 3-10 MPa to form a green compact, and sintering said green compact of gamma $LiAlO_2$ at about 1200-1400 K. for 0.5 to 12 hours to form a porous integral tile of more than 50% porosity with adjacent particles consisting essentially of gamma $LiAlO_2$ mutually diffused at points of contact over a portion of the particle surface area.

* * * * *